United States Patent [19]

Prazdny

[11] Patent Number: 4,745,562
[45] Date of Patent: May 17, 1988

[54] SIGNAL PROCESSING DISPARITY RESOLUTION

[75] Inventor: Kvetoslav F. Prazdny, Palo Alto, Calif.

[73] Assignee: Schlumberger, Limited, New York, N.Y.

[21] Appl. No.: 766,747

[22] Filed: Aug. 16, 1985

[51] Int. Cl.$^4$ .................. G01B 11/04; B25J 19/02
[52] U.S. Cl. .................. 364/551; 356/390; 382/30; 901/47
[58] Field of Search ........... 364/551, 556, 559, 560; 356/390; 382/30, 33, 34; 901/47; 340/146.2

[56] References Cited

U.S. PATENT DOCUMENTS

| | | | |
|---|---|---|---|
| 3,840,857 | 10/1974 | Knight et al. | 382/30 |
| 4,244,029 | 1/1981 | Hogan et al. | 382/34 |
| 4,311,914 | 1/1982 | Huber | 382/30 |
| 4,345,312 | 8/1982 | Yasuye et al. | 382/34 |
| 4,571,697 | 2/1986 | Watanabe | 364/561 |
| 4,607,340 | 8/1986 | Nagai | 364/551 |
| 4,613,942 | 9/1986 | Chen | 901/47 |

FOREIGN PATENT DOCUMENTS 3235743  3/1984  Fed. Rep. of Germany ........ 382/34

Primary Examiner—M. H. Paschall
Assistant Examiner—Geoffrey S. Evans
Attorney, Agent, or Firm—Theodore S. Park; Robert C. Colwell

[57] ABSTRACT

A process for signal matching. The process is general and can be applied to matching signals of arbitrary dimension. To implement the process, a suitable discretized description of the two signals to be matched is defined. Such descriptions can be the local signal extrema or any other qualitative signal significant points of interest or features. Allowable feature matches and values for matches are defined, and determined for all potential matches. Matches are confined to the features within defined matching windows and are mapped for each significant point. Within a defined similarity disparity window, a neighborhood of potentially interacting matches are evaluated. Matches within a neighborhood contribute to the decision about the appropriate match for each significant point to determine a composite similarity weighted best value match for each point. Mapping is piecewise continuous. The two signals are matched with disparities therebetween resolved and removed responsive to the best match values. Following the coherence process, the overall process of the present invention provides a superposition of several such piecewise transformations.

In an illustrated application domain, a stereo correspondence technique provides for matching of figurally similar three dimensional images, according to a simple no iterative, parallel and local process that can successfully detect disparities of opaque as well as transparent surfaces.

20 Claims, 5 Drawing Sheets

FIG._4A. WAVEFORM 1

FIG._4B. WAVEFORM 2

FIG._5. WAVEFORM 1 WAVEFORM 2

FIG._8A. CHARACTERISTIC DATA

| SET I.D. TYPES WITHIN SET VALUES |
|---|
| MATCH WINDOW CRITERIA |
| DISPARITY WINDOW CRITERIA |
| . . . . . . . . . . . . . . . |

SIGNIFICANT POINTS – WAVEFORM 1

| | | |
|---|---|---|
| $X_1$ | $Y_1$ | TYPE |
| $X_2$ | $Y_2$ | TYPE |
| $X_3$ | $Y_3$ | TYPE |

SIGNIFICANT POINTS – WAVEFORM 2

| | | |
|---|---|---|
| $X_A$ | $Y_A$ | TYPE |
| $X_B$ | $Y_B$ | TYPE |
| $X_C$ | $Y_C$ | TYPE |

FIG._8C. ALLOWABLE MATCHES

270 →

| $X_1$ $Y_1$ $X_A$ $Y_A$ | MATCH VALUES OFFSET |
|---|---|
| $X_1$ $Y_1$ $X_B$ $Y_B$ | MATCH VALUES OFFSET |
| $X_2$ $Y_2$ $X_C$ $Y_C$ | MATCH VALUES OFFSET |
| . . . . . . . . . . . . . . . . | |

FIG._8D. COMPOSITE DISPARITY SIMILARITY

290 →

POINT 1

| $X_1$ $Y_1$ | $X_A$ $Y_A$ | COMPOSITE VALUE |
|---|---|---|
| $X_1$ $Y_1$ | $X_B$ $Y_B$ | COMPOSITE VALUE |
| $X_1$ $Y_1$ | $X_C$ $Y_C$ | COMPOSITE VALUE |
| . . . . | . . . . | . . . . . . . . . . . . . |

POINT N

| $X_N$ $Y_N$ | X Y | COMPOSITE VALUE |
|---|---|---|
| $X_N$ $Y_N$ | $X_S$ $Y_S$ | COMPOSITE VALUE |
| $X_N$ $Y_N$ | $X_T$ $Y_T$ | COMPOSITE VALUE |
| | | |

FIG._8E. BEST MATCH

310 →

| | |
|---|---|
| $X_1$ $Y_1$ | $X_B$ $Y_B$ |
| $X_2$ $Y_2$ | $X_D$ $Y_D$ |
| ⋮ | ⋮ |
| $X_N$ $Y_N$ | $X_T$ $Y_T$ |

SIGNAL PROCESSING DISPARITY RESOLUTION

FIELD OF THE INVENTION

This invention relates to the practical utilization of sensor signal matching of two related but distinct signals, and more particularly to a fast signal matching and disparity resolution system and process.

DISCUSSION OF THE TECHNICAL PROBLEM

In acquiring, analyzing, and characterizing the sensor data representative of physical phenomenon, data matching and feature extraction are critical parts to providing a useful result from acquired sensor data. Whether in correlating cardiovascular to respiratory signal measurements, multiple image source signals, or well-logging sensor signals, signal processing techniques serve an important function in application domains utilizing sensor data.

In practical applications of signal processing, it is usually required to correlate two or more interrelated but independently taken signal measurements to derive meaningful information from the raw signal patterns. Many practical applications require analysis of sensor data to perform useful functions, including well logging, computer vision, robotics, and many others. However, analysis requires initial matching of related but transformed waveforms and data sets. Whether measurements of physical parameters are made by similar sensors independently, or by different types of sensors, the resulting sensor signals are usually not directly or easily correlated. Matching of the two signals is necessary prior to determining useful information from the two signals. For example, in a well-logging application, different types of sensors, infrared and sonic, may be placed in the same outhole or in different outholes to derive information about the same geological formation. Similarly, in a robotics computer vision environment, two physically displaced video cameras can provide images of the same object from different viewing angles and provide different signal patterns.

Prior techniques have utilized numerical correlation techniques and empirically-derived matching algorithms in conjunction with a digital computer to attempt to correlate two sets of sensor data regarding a single application domain. Thus, measurement of changes in intensity of waveforms, edge detection routines, and moving window overlap correlation have all been used in an attempt to match two related but transformed waveforms or data sets. One major problem with prior art techniques which have been used in binocular stereopsis is the inability to accurately handle edge regions and transparent regions in solid surfaces. Because of this problem, erroneous results can occur from prior art analysis of two waveforms which are skewed but otherwise represent the same physical phenomenon.

SUMMARY OF THE INVENTION

The present invention is directed to a fast and economical process for resolving ambiguities and disparities and identifying useful stimuli from interrelated but transformed sensor data from plural sensors. Examples of applications include robotics, computer vision, manufacturing and testing, seismic exploration, and in general any signal processing application dealing with relating transformed waveforms or sets of data. The present invention is not limited by or directed to any particular matching or deterministic algorithms or computer programs or logic. Rather, in accordance with the present invention, related sensor signals from plural sensors can be interrelated, analyzed and interpreted with the assistance of electronic and/or computing systems to provide for useful functions responsive to the plural sensor data.

By using the technique and process of the present invention, many useful functions can be provided, many of which were not heretofore obtainable with prior techniques.

According to the process of the present invention, significant points of interest on each of the waveforms to be matched are identified, and sets of allowable matches between points of interest are permitted only within defined local regions (hereafter referred to as match windows). Positional offset information (also referred to herein as disparity information) for each allowable match is determined, and the quality of each allowable match is evaluated within the local match windows. Thereafter, second regions are defined (hereafter referred to as disparity windows) within which support for particular ones of the allowable matches in sought from positional offset information of neighboring points of interest. This step of the inventive process is conceptually founded on the expectation that neighboring image points corresponding to the same physical source should have nearly the same positional offset to an allowable match within its locality; i.e., neighboring points corresponding to the same source should have nearly the same positional offsets. As a result, the process according to the present invention utilizes as a principal mechanism of eliminating ambiguity between the two waveforms the support provided by neighboring points based upon similarity of positional offset information. The degree of support for each allowable match resulting from similarity of positional offset information is combined with the information concerning quality of match for each allowable match in order to reach a decision as to the best allowable match for each point of interest.

More particularly, a process is provided for resolving ambiguities and matching two related but transformed signal waveforms representative of sensor outputs in a particular application domain, which waveforms have been processed to provide first and second digitized data sets representative of the two waveforms. The process comprises the steps of:

selecting criteria, associated with the particular application domain, for use in the determination of significant points of interest, type sets of allowable types of point matches, valuation of match quality, match windows, disparity windows, and disparity similarity valuation;

analyzing each data set, and determining positional offset information and type information for significant points of interest in each data set responsive to the criteria;

storing the type information associatively mapped to positional offset information for each significant point of interest in each data set;

determining a match window for each significant point of interest responsive to the criteria;

analyzing the two data sets to locate and determine match similarity values for all allowable matches between points of interest in the two data sets, within respective match windows, responsive to the criteria;

storing, for each significant point of interest in the first data set, the match quality values each associatively mapped to positional offset data for the relative distance offset between each point in the first data set and each allowable match point in the second data set;

determining disparity windows for all significant points within the two data sets, responsive to the criteria;

determining, and storing, associatively mapped to positional offset data, composite similarity values for each allowable match to a particular point in the first data set, responsive to the disparity similarity values for each allowable match to said particular point and to the disparity similarity values for correspondingly offset allowable matches for other points in the first data set, for points within the disparity window for said particular point, responsive to the criteria and to the match value associatively mapped store;

storing in a best match store, for each said particular point within the first data set, the positional information for the particular point, and for the allowable match point in the second data set having the maximum composite similarity value for the respective particular point, responsive to the criteria, the match value store, and to the composite similarity value store;

matching the two signal waveforms and resolving disparities therebetween responsive to the criteria and the best match store.

BRIEF DESCRIPTION OF THE DRAWINGS

The foregoing and other objects, features and advantages of the present invention will become apparent from the following detailed description of the invention, as illustrated in the accompanying drawings wherein.

DETAILED DESCRIPTION OF THE PREFERRED EMBODIMENTS

The present invention relates to a system and process for signal matching. The process is general and can be applied to matching signals of arbitrary dimension. To implement the process, a suitable discretized description of the two signals to be matched is preferably defined (e.g. See FIG. 8A). Such descriptions can be the local signal extrema or any other qualitative signal significant points of interest or features. Allowable feature matches and values for matches are defined, and determined for all potential matches (e.g. See FIGS. 4A-B). Matches are confined to the features within defined match windows and are mapped according to potential offset for each significant point (i.e. P1, P2, P3 of FIG. 4A). Within a defined disparity window, a neighborhood of potentially interacting matches are evaluated (e.g. See FIGS. 5, 6, 7A-C, 8D). Matches within a neighborhood contribute to the decision about the best match for each significant point to determine a composite similarity weighted best value match for each point of interest (e.g. See FIGS. 7A-C, 8D-E). The two signals are matched with disparities therebetween resolved responsive to the best match values (e.g. See FIGS. 6, 7A-C, 8C-E).

Figure 1:
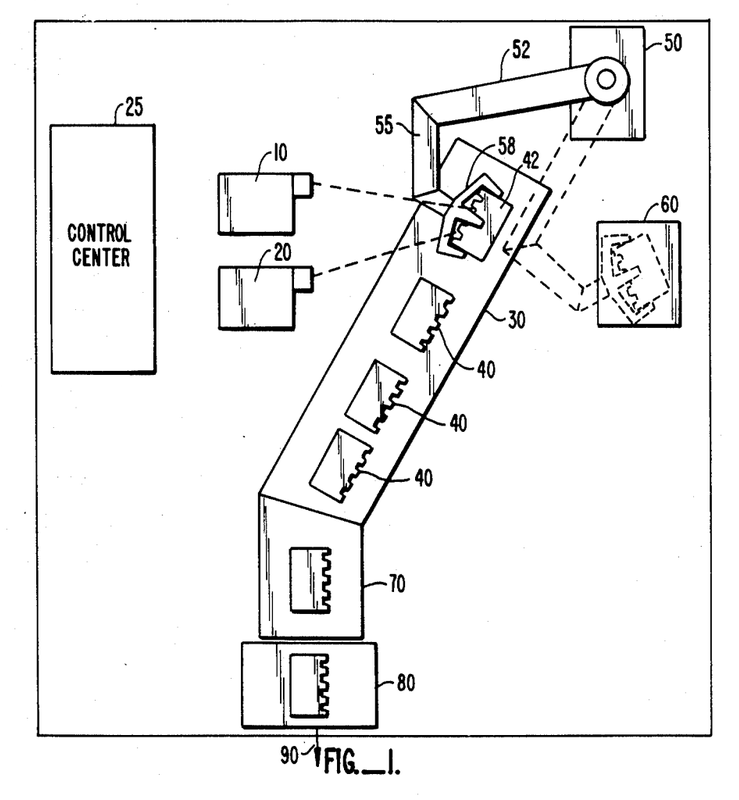
FIG. 1 is a top view of a computer vision controlled automated production line which utilizes the present invention.

Referring now to FIG. 1, an automated production line test station is shown to illustrate a representative application for the practice of the present invention. Two cameras 10 and 20, having a positional offset relative to one another for providing different perspective views of the object upon which each camera is focused, provide signals representative of the relative viewing perspective visual images to a control electronics center 25. The control electronics center 25 analyzes the signals coming from the cameras 10 and 20 and provides robot control signal outputs to a robot 50 to perform a useful function as will be described hereafter. The cameras are aimed so as to converge on a single point on the conveyor 30 which is carrying piece parts 40. Parts 40 which continue along the conveyor 30 uninterrupted by the robot 50 pass onto an elevator 70 which lifts the parts into a conveyor 80 which carries the parts to the next level of part processing designated 90. Part processing 90 could be drill and bore, place and connect, weld, etc. The cameras 10 and 20 are illustrated as focusing on a particular piece part 42 on the conveyor 30 at a position within the reach of the arm and hand of the robot 50. The cameras 10 and 20 provide visual image data of the piece part 42 for analysis and utilization by the control electronics center 25 which, for example, may look for part breakage or chippage or improper orientation. Once the images from the two cameras have been adjusted to compensate for perspective differences of the viewed images, any one or more of numerous computer vision analysis techniques can be utilized for orientation or continuity analysis. In accordance with the present invention, the disparities and ambiguities between the two signal waveforms coming from the cameras 10 and 20 are resolved to provide signals or data sets which can be and are further utilized to make a determination as to the acceptance or rejection of the piece part 42. If the piece part is acceptable, no robot action is taken. However, if a problem is detected in the piece part, the control electronics center 25 generates control signals to the robot electronics 50 which causes the arm 52, jointed arm 55 and hand 58 to cooperatively interact so as to remove the part 42 from the conveyor 30 and drop it in a reject bin 60.

Figure 2:
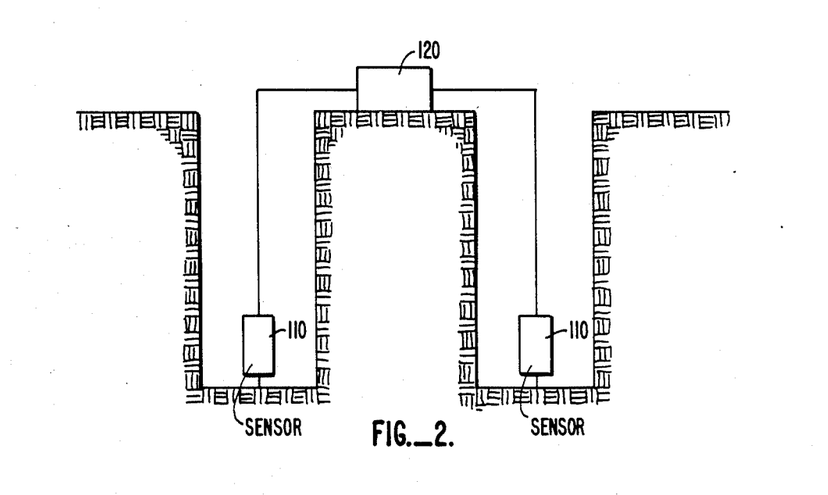
FIG. 2 is a side view illustrating a well-logging multiple sensor based application of the present invention.

Referring to FIG. 2, a well-logging application of the present invention is illustrated in which two tools with sensors 110, are placed in holes in the ground separated by 100 feet, with the sensors placed at equivalent depths of, for example, 50 feet below the ground surface. The two sensors 110 are coupled to a control electronics center 120. In accordance with the present invention, disparities between the signals output from the two sensors 110 are resolved to provide unambiguously matched signals and data sets from which further analysis and utilization can proceed.

There are many other application domains within which the teachings of the present invention can be utilized. The present invention is, however, independent of the application domain and may be adapted to fit a wide variety of application domains.

As discussed briefly above, the waveform matching process of the present invention can be broadly and cenceptually understood to invovle the determination and evaluation of the quality of allowable matches within a first, generally local, region of the waveform; followed by a determination of the degree of support such allowable matches receive from allowable matches of neighboring points within a second defined region of the waveform, with support being largely dependent upon similarities in the positional offsets between allowable matches.

With reference to FIGS. 3A-B, 4A-B and 5A-C, the method of the present invention is illustrated in the form of a flow chart, exemplary waveforms to be matched, and positional offset diagrams. Although not limiting to the invention, it is convenient that the invention be practiced utilizing a programmable computer.

Figure 3A:
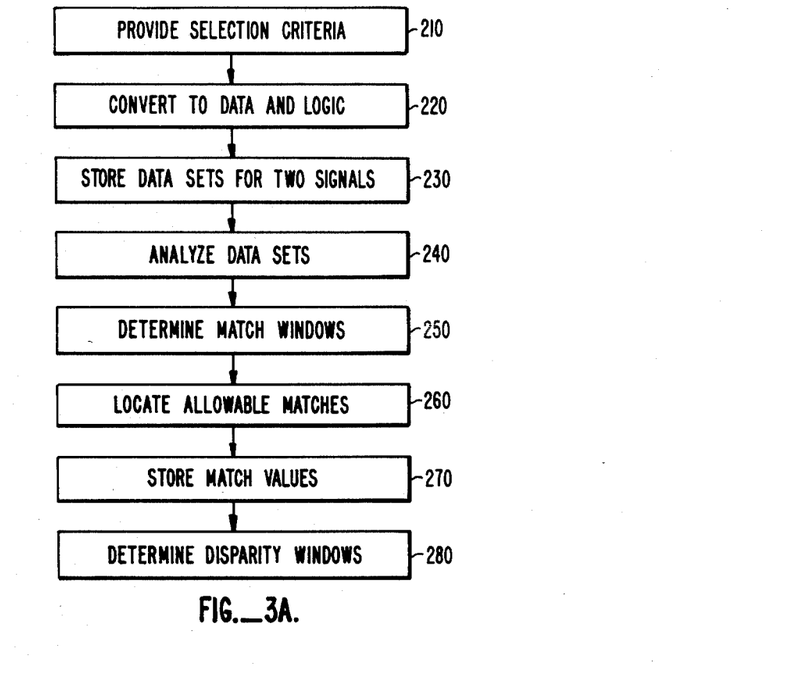
FIGS. 3A-B is a flow chart of an exemplary process flow associated with practicing the present invention.
Figure 3B:
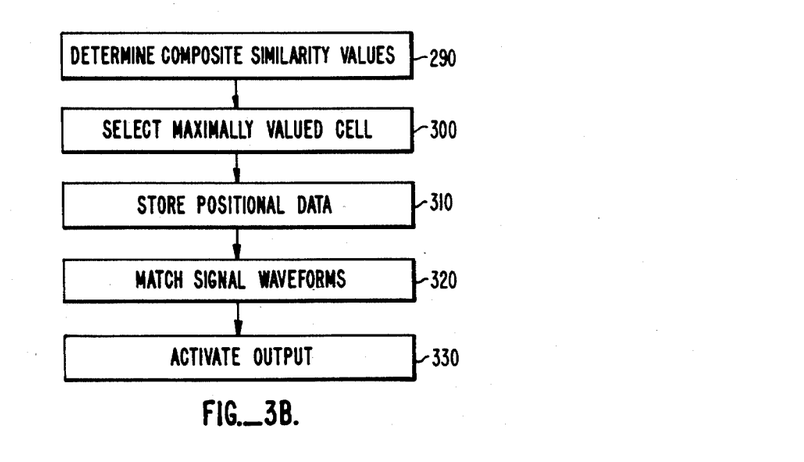
Figure 4A:
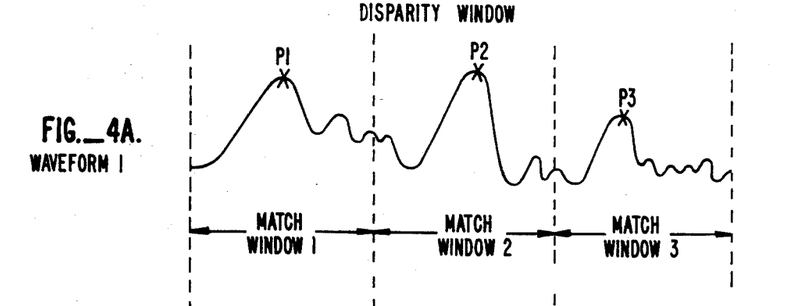
FIGS. 4A-B are waveforms illustrating the application of the present invention to utilization in a simplified application domain.
Figure 4B:
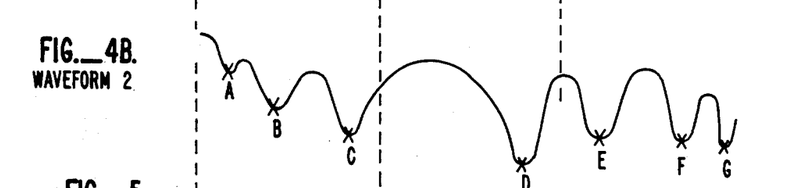

According to the process of the invention, waveform 1 of FIG. 4A is to be matched to waveform 2 of FIG. 4B. As an initial step in the practice of the invention, illustrated as step 210 in FIG. 3A, it is necessary to establish or select criteria which will enable the user to identify significant points of interest on waveforms 1 and 2; types of allowable matches between significant points; match windows representing ranges in which matches may occur; match quality evaluation; disparity windows representing ranges in which disparities of neighboring significant points will impact the best match choice for a particular significant point; and disparity similarity valuation relationships.

In selecting criteria for identifying significant points of interest on the two waveforms, information about the source of waveform 1 and 2 is preferably known which relates the characteristics of the waveform to something of interest in the physical world. For example, in a well-logging application where two signals from two different types of sensors are to be correlated, maxima on one waveform may be of a particular significance while minima on the other waveform are significant. In another application such as in binocular stereopsis where the sensors generating waveforms 1 and 2 are very similar, the significant points of interest on each waveform could be the same and take the form of maxima, minima, points of inception, zero-crossings, peak positive slopes, peak negative slopes, etc.

One technique of determining characteristics of a significant point of interest is looking for rapid changes in waveforms, such as by taking derivatives of edges. Significant points of interest can be determined by any manner and according to whatever criteria one chooses to select in accordance with the goals of choosing the points.

The relationship between the two waveforms is defined by a transformation. The criteria for choosing significant points of interest is preferably selected so that the chosen points are least affected, or alternatively stated are preserved, by the transformation, so that local correspondence within the waveforms and between the waveforms are not destroyed by the transformation. Significant points of interest are chosen such that they are invarient (i.e. unaltered) by the transformation between the two waveforms. First, to define the criteria needed to select significant points of interest, one must understand the physical characteristics of the waveforms and the interrelationship of the waveforms.

For example, suppose one way trying to dissect a transformation from picture to picture, such as having a radar picture of a scene and an optical picture of a scene. Further, suppose it is desired to find the relationship or transformation between these two pictures of the same scene. To provide for matching of the pictures, one must choose as the significant points of interest those points in each scene which are likely to be preserved relative to the transformation as between the two waveforms. For example, the radar signal pattern may destroy objects which would be seen in the optical picture. Thus, one would avoid choosing as any significant point of interest, or as critera for choosing significant points of interest, any points which would be destroyed or altered in the radar picture but would be preserved in the optical picture. First, one must know something about the physical properties by which the transformation is created. For example, in the case of radar, it might reflect the metal not the wood. The two waveforms to be matched must be related initially or there would be no reason to match them.

In selecting criteria for determining types of allowable matches among significant points, it is recognized that it may be inappropriate to match certain types of significant points with other types of significant points. For example, where both maxima and minima have been identified as significant, it may be meaningful to only match maxima with minima with minima, or some other set of allowable types of matched depending upon the physical significance of the waveforms.

In general, a type can be matched to a set, the set containing one or more types. Thus, for exampe, a type 1 point could match to a type 1 point or to a type 2 point, but not to a type 3 point; a type 2 point could match to a type 4 point but not any other point, etc. Thus, each point of a particular type on waveform 1 can be matched only to its allowable type match set of type or types in waveform 2. The types within the sets which provide allowable matches are determined by the application and defined according to the application.

As an example, consider a well-logging application in which one sensor is a gamma sensor which emits radiation and measures the reflection response of the radiated signal, and the other sensor is a sensor that measures electromagnetic potential. It may be that a maximum or peak in the gamma radiation waveform may correspond to a minima or valley in the electromagnetic potential measurement waveform. In this case, an allowable match would be a peak to valley but not a peak-to-peak match between the waveforms. This is one way to determine the points of interest. In this specific example, there is only one type within the type set. However, the type set can include more than one type, and the types of matches can either have an equal weight or can be unevenly weighted. For example, it may be that the invariance is not complee between the waveforms, and that a maximum may also correspond to an inflection point in the waveforms (i.e. an edge between a peak and valley).

In the binocular vision application example, match sets of allowable types to be matched can, for example, be based on matching of edges, where positive edges are matched to positive edges and negative edges are matched to negative edges. A positive edge is an edge with a positive slope, and a negative edge is an edge with a negative slope. In this example, there is only one allowable type set, positive to positive or negative to negative. Thus, only one type within each set is an allowable match. A source of waveforms for this example could be two cameras physically displaced providing optical images of the same scene from different viewing perspectives. The weighting values given the matches can be a one for a match and a zero for no match.

In selecting criteria for determining match windows, it is also useful to have knowledge of the relationship of the waveforms to the physical world, in that the match window represents the range in which, for a significant point on one waveform, a match is permitted on the other waveform. The match window is chosen to include only those points of interest on the waveform which could in probability be related to the particular significant point under consideration, taking into account the physical limitations of the sensor and the particular application. In a binocular stereopsis application, for example, it might be known from the positioning of the video cameras that matching can only occur within a neighborhood determined by camera spacing and object distances. Likewise, in a seismic application, points on two waveforms might be meaningless if separated by a distance representing more than 100 feet. Selection of unnecessarily large match windows results in greater computational time and expense, while a smaller than optimum match window selection could exclude best match points from the match window. Determination of proper match window may require an empirical study in which different match windows are tested to optimize results.

In selecting criteria for determining disparity windows, the user of the present invention effectively establishes for each particular point of interest on a given waveform the range along that waveform in which the disparities of neighboring significant points will affect the determination of the best match for the original point of interest. The choice of this window can be determined empirically, and, in general, is related to the steepness of the transformation between the waveforms. That is, the disparity window is related to the relative rate of change and transformation between the two waveforms. Thus, the size of this window is related to the type of transformation, and can, for example, be a wide window for a linear transformation such as a phase shift. However, where the transformation is nonlinear such as sinuosidal, the window would be chosen narrower.

Figure 8A:
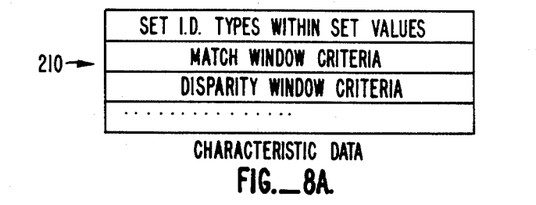
FIGS. 8A-8E are memory maps and tables illustrating the application of the process of FIG. 3.

In step 220 of FIG. 3, the criteria as determined in step 210 may be converted to characteristic data or logic which can be utilized by the programmable computer during analysis of the two waveforms or data sets. Each data set is representative of one of the two waveforms which are to be analyzed and utilized. The characteristic data can be stored in system memory, as shown in FIG. 8A.

In the next step, 230 of FIG. 3, for each data set, significant points of interest are located and values representing the type of significant point are stored for that data set associatively mapped to each significant point's positional data responsive to the criteria of step 210.

Figure 8B:
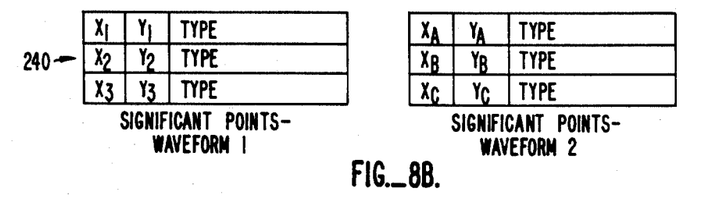

As shown in the example illustrated in FIG. 4A and B, points P1, P2 and P3 are identified as the significant points of waveform 1, and points A,B,C,D,E,F and G as the significant points of waveform 2, with significant points on waveform 1 corresponding to maxima and significant points on waveform 2 corresponding to minima. As shown in FIG. 8B, the information concerning the position and type of reach significant point of waveforms 1 an 2 can be conveniently stored in system memory as two associatively mapped stores.

With reference to step 250 of FIG. 3A, match windows for each significant point are selected in accordance with the criteria determined in step 210. As described above, the match window for a particular significant point serves to limit the range of potential best matches to significant points on the other waveform. For example, and with reference to FIGS. 4A and B, match windows 1,2 and 3 are identified by vertical dotted lines for waveform 1 points P1,P2 and P3 respectively. As can be seen in FIG. 4B, the selection of match window 1 for point P1 limits its potential best match selection to points A,B and C only, and excludes as potential best matches points D,E,F and G. Although not shown in FIG. 4A and B, it is also contemplated that match windows could be selected for points A,B,C,D,E,F and G of waveform 2, and the matching process of the present invention be carried out in parallel for both waveforms.

Figures 5, 5A:
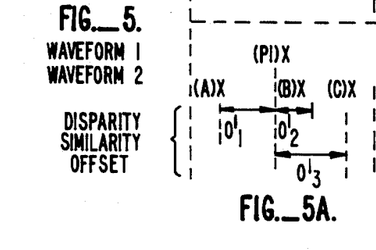
FIG. 5 is an illustration of the determination of positional offset information for signficant points of interest of the waveforms of FIG. 4A, illustrating the concept of disparity similarity for a point P1 on waveform of FIG. 4A and relative offsets to points on the waveform of FIG. 4B, with the offsets to point P1 being designated 011, 012, and 013; with the offset from a second point P2 on the waveform of FIG. 4A, to a point of FIG. 4B, yielding offset 012; and with the corresponding offsets from a point P3 of the waveform of FIG. 4A to points of FIG. 4B, yielding offsets 031, 032, and 033.
Figure 5B:
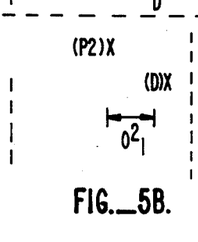
Figure 5C:
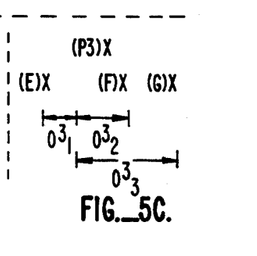

Next, as shown at step 260, the system locates allowable matches between points on the two data sets within each match window responsive to the characteristic data and responsive to the associatively mapped store of step 240 which provides information on the type and position of each point of interest in each data set. Each allowable match is valued with a match similarity value responsive to the selected criteria and disparity or positional offset values are determined corresponding to the relative distance offset between matched points. With reference to FIG. 4A and B, and FIG. 5, the disparity or positional offset values relating point P1 to points A,B, and C within match window 1 are graphically illustrated in FIG. 5A as distances along the X-coordinate and are labelled 01,02 and 03, respectively. As FIGS. 5B and 5C illustrate, positional offset values are similarly determined for all allowable matches of points P2 and P3.

Within the local region of match window 1 of FIGS. 4A and B and 5, there may exist considerable ambiguity in determining a best match for point P1. It is clear in the illustration that the type of allowable match, as determined by the criteria of step 210, is for relative maxima of waveform 1 to match with relative minima of waveform 2. Assuming that according to the criteria of step 210, a higher quality of match occurs between a high valued maxima and a low valued minima than between a high valued maxima and a relatively higher valued minima, it is clear that point P1 has a greater match quality with point C than with points A or B. However it is also clear that the positional offset of point C is greater from point P1 than the positional offset of point B. Thus, there is ambiguity within the local match window 1 as to whether point B or C is the best match for point P1.

Figure 8C:
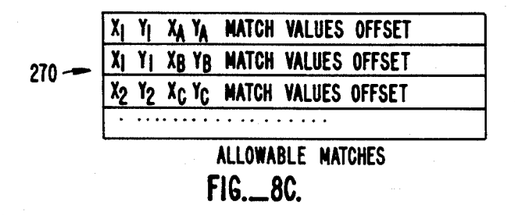

As shown at step 270, the match similaity values for each allowable match are stored, associatively mapped according to positional offset values and according to each particular point's position within the first data set. This is illustrated in FIG. 8C, where: the first entry in each line of storage is the positional information for the first point in the first data set, x1 y1; the next entry is the positional data xa ya for an allowable match in the second data set withnin the match window; the next entry is the match value for that match (which in the simplest case could be a "1" for a match and a "0" for no match) and, positional offset information respresenting a relative spatial offset between the point on the first waveform and the allowable match point on the second waveform.

In summary, at step 240, significant points of interest are extracted from the waveforms and positionally mapped and stored. Then, a compatibility process as detailed in steps 250 to 270 determines how these points and the values (e.g. match values) and positional information for each can be matched. In other words, allowable types of matches of types of points are determined.

The next step, 280, serves to determine the disparity windows for use in determining disparity similarity values and composite similarity values, the disparity windows being determined responsive to the criteria of step 210 for all points within the data sets. As described above, the disparity windows define the neighborhood in which positional offset information of neighboring points of interest impact upon the choice of a best match for each particular point under consideration.

The next step, 290, is a multi-level process in which support provided by the positional offset information of neighboring points within the disparity window is evaluated. This requires the user to specifically define what is meant by disparity similarity, i.e., it is necessary to quantify the similarity between neighboring disparities and the support resulting therefrom. This quantification of the support provided by similarity of positional offset information will depend upon the application domain, but certain guidelines can be identified to assist in the formulation. For example, it is preferred that a simple scalar function be utilized if an appropriate one can be identified. In addition, the selected disparity similarity function should be generally be inversely proportional to the difference fo the disparities of interacting points. In addition, the function should generally reflect that nearly interacting points would likely exert greater supporting influence than more distant interacting points. In the particular application domain of binocular stereopsis, a disparity similarity function in the form of a Gaussian distribution function was utilized in the practice of the invention. Greater detail about the specifics of this Gaussian distribution function are provided in the discussion about binocular stereopsis which follows. However, the present invention is not limited to any particular disparity similarity function and may be prcticed using a considerble variety of different disparity similarity functions.

After selection of an appropriate disparity similarity function, a series of calculations are performed, preferably upon a programmable computer to expedite the process. With continued reference to step 290 of FIG. 3, composite similarity values are determined for each allowable match for each particular point in the first data set, based on the match quality value and the support provided by the disparity similarity of allowable matches for a particular point and each of its neighboring points within the first data set, within the disparity window. Associated with each allowable match, a "disparity cell" is established whose value indicates the amount of similarity support the particular allowable match receives from its neighbors. Neighboring dispairties are allowed to interact in accordance with the disparity similarity function which was established formerly. More specifically, suppose that a significant point on waveform 1 has a set of possible allowable match disparities Di and that we are interested in the amount of support an allowable match disparity di Di receives from its neighboring point Lj (with allowable match disparities Dj). In one embodiment of the invention, the disparity d* is located from among the set of disparities in set Dj, which is the nearest to di (i.e., for which di-d* is the minimum). The disparity cell associated with allowable match disparity di of the point Li is then incremented by an appropriate amount w(i,j) which is the support a given disparity at i receives from disparities at j (obtained by substituting into the disparity similarity function the value of di−dj). After all allowable match disparities at a given point have been evaluated in this way the disparity with the largest amount of support is chosen as the most likely best match for that point.

Thus, as shown in step 290, the composite similarity values for all allowable matches within a window are summed in activity "cells", with each point in the first data set having a set of composite similarity activity cells associated with it. The composite similarity values for allowable matches to the particularl point and for allowable neighboring point matches are summed in activity cells for the first particular point according to the positional offsets of the allowable matches, responsive to the associatively mapped store of step 270. The composite similarity activity cells are illustrated in FIG. 8D.

Figure 8D:
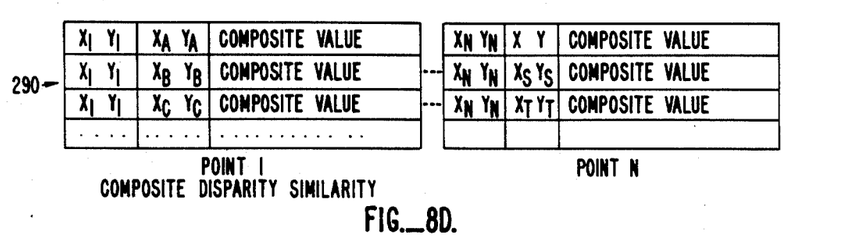

As shown in FIG. 8D, each point, point 1 to point N, in the first data set, has a composite similarity activity table associated with it. Each such table has numerous entries. These entries value all allowable matches, based on the compatibility and disparity similarity of allowable matches for the particular point for which the activity table exists, and taking into account the compatibility and disparity similarity of neighboring cells as to similarly offset allowable matches. Thus, for example, each activity table entry includes the point of interest of the activity table as the first entry, the positional information for the allowable match as a second entry, and the composite similarity value as the next value.

The composite similarity process is applied for all points. For each point of interest in the first waveform or data set, a disparity window is chosen. Within the disparity window, allowable matches are valued point by point according to the composite siimilarity process, for similarity to allowable matches for neighboring points of interest on waveform 1 to corresponding neighboring points on waveform 2 within the disparity window according to the composite similarity process. The composite similarity process includes a coherence process, reflected in the match values and sets of allowable matches, and in the disparity and composite similarity process which eliminates certain otherwise allowable matches from being allowed, even though their type set would allow for a match.

Application of the process of FIG. 3 can be done in parallel, and is applied and repeated for all points in the waveforms or data sets. A window is defined and associations are looked at for points within that window, analyzing relationships of multiple points of the two signals within the window in parallel, to determine a best value match to a point on the second waveform, for each point of interest on the first waveform, based on a weighting of matches for neighboring points on the first waveform. Definition of the match and disparity windows is determined by the application.

Thus, there are two sub-processes which make up the composite similarity process. The first sub-process (i.e. compatibility similarity) is a function of the value or quality of match of two tokens or two types. The second sub-process (i.e. disparity similarity) is a function of the distance between matches (i.e. the relative offset, the separation of neighboring points from their allowable matches). The composite similarity process takes into account the two similarity sub-processes to provide a single composite similarity value based on the two similarity sub-processes and functions. The composite similarity process can be accomplished in separate steps, or can be determined in a single step taking both sub-processes into account simultaneously.

Continuing, as illustrated in Step 300, the maximally valued activity cell is selected for each particular point, as illustrated in FIG. 8D. The maximally valued activity cell for each particular point is selected as identifying the best match for that particular point. This is done for all points within all windows.

Figure 8E:
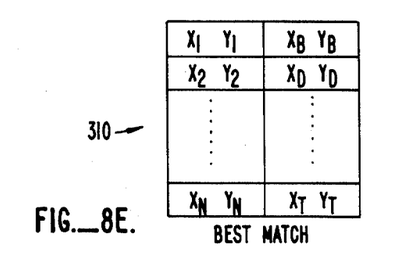

Positional data can be stored for the best match from the second data set for each point of interest in the first data set. The resulting best match points can be associatively mapped to each other and stored in memory as illustrated in FIG. 8E. In FIG. 8E, a best match table relates positional data for corresponding best match points between the first and second waveforms. The result of this process yields a fused data set representing coherent data about the related waveforms, which provides the means for resolving ambiguities and disparities between the two transformed data sets.

Next, as shown in Step 320, further application domain related analysis and procedures can be provided to extract relevant data and to provide for determination of desirable actions, responsive to the associative mapping of Step 310.

Outputs can be activated by the system as appropriate responsive to the analysis step of Step 320.

Figure 6:
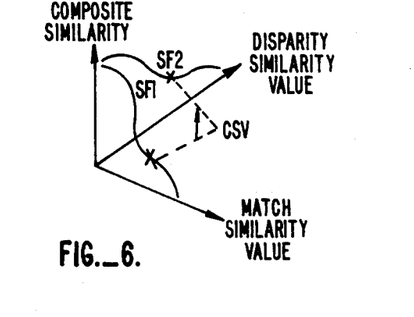
FIG. 6 illustrates the generation and determination of the composite similarity value, shown as a vector value CSV which is derived from the two subprocesses of the similarity process indicated as SF1 and SF2 in FIG. 6.

Referring to FIG. 6, a graph illustrating the determination of composite similarity is shown. In the illustration of FIG. 6, there are three axes: an 'x' axis illustrating match quality or compatibility similarity value, a 'y' axis indicating disparity similarity value, and a 'z' axis representing composite similarity. Graphically represented, the match quality similarity and disparity similarity values for an allowable match between a point of interest on waveform 1 and a point of interest on waveform 2 are combined to produce a composite similarity value, which can be viewed as a vector value of the match similarity value and disparity similarity value. The actual generation of the composite similarity value can be done in a single step. However, it should be noted that the composite similarity value is determined for each allowable match.

Figure 7A:
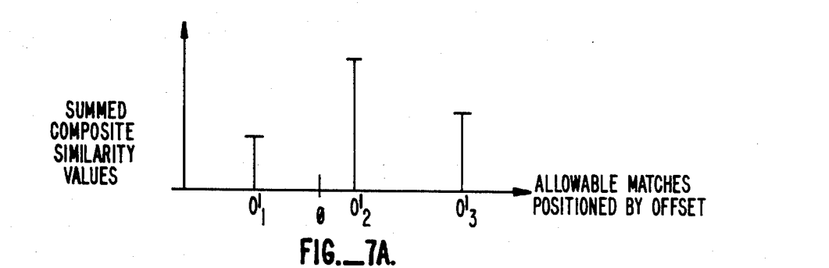
FIGS. 7A-7C are a graphical illustration of the activity cells for point P1, wherein the magnitude as shown on the vertical axis is indicative of the summed value in an activity cell.
Figure 7B:
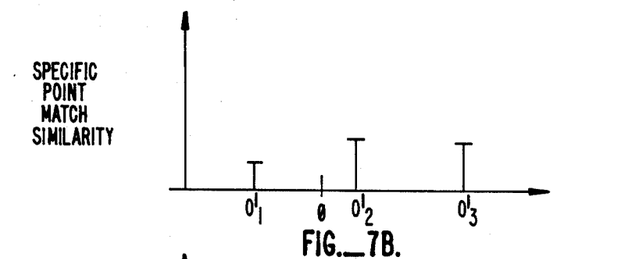
Figure 7C:
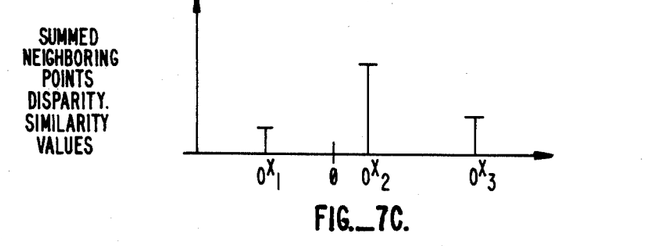

Referring to FIGS. 7A–C, the determination of best allowable match is graphically illustrated as a histograming process. For each point of interest on waveform 1 having corresponding allowable matches on waveform 2, a table of match values versus positional offset is created for all allowable mathces.

A "histogram" in memory storage is created using the composite similarity values. Referring to FIGS. 4A–B, and starting with point P1 on waveform 1, there as multiple points on waveform 2 which could match the host point on waveform 1. Each allowable match is given a value associately mapped by its positional offset on the horizontal axis from the host point within the first waveform (e.g. the host point being at offset 0, with positional offsets being plus and minus from the host point). Neighboring points within the match window are similarly analyzed for all respective allowable matches with values given to each allowable match, said values being associatively mapped into a storage memory based on the positional offset of the matched point on waveform 2 to the host point on waveform 1. Thus, for example, if a host point has three possible matches, one directly below it, one offset to the right some distance x, and one offset to the right some distance y, the associative mapping would be to positional offsets 0, x, and y. The values for the matches will be greater, and the points more likely to match, for similar offsets than for differing offsets. The composite similarity value for each match for a host point and neighboring points to the host point within a disparity window are summed for similar offsets, to provide a composite similarity histogram mapping for each host point mapped according to relative offset of allowable match points to the host and its neighboring points.

FIG. 7A illustrated the summed composite similarity values table for point 1. Each point on the first waveform has a summed composite similarity values table generated for the composite summing of all allowable matches to determine the effect on a particular point in waveform 1 within the disparity window. The summed composite similarity values of FIG. 7A are determined from the particular point match similarity values, as illustrated in FIG. 7B, for the point in interest, in this case point 1, to determine a value of match based only on the particular point and its allowable matches, match values, and local disparity factoring of some sort. FIG. 7C illustrates a similarity value histogram for the sum of all neighboring points disparity similarity values relative to the particular point mapped according to respective offsets relative to the particular point.

In this manner, a summation of all neighboring points contributions to the composite similarity value for a given offset value are factored into the final sum composite similarity values of FIG. 7A. By combining the particular point match similarity values of FIG. 7B with the summed neighboring points similarity values of FIG. 7C, summing of similarity offset values provides the summed composite similarity values of FIG. 7A, wherein each similarity value for a given offset respesents the composite similarity value taking into consideration the local and neighboring type similarities, compatibility and disparity similarities, to determine a value of match which takes into account both local effects and general effects of the waveforms.

FIGS. 8A–8E used in conjunction with FIG. 3, illustrate application of the methodology of the present invention. Referring to FIGS. 8A–8E, the memory utilization patterns, mapping and organization are graphically illustrated, and show one alterantive means of implementing the methodology of the process flow of FIG. 3 in a programmable digital computer.

FIG. 8A illustrates storage of characteristic data including type match sets, match window criteria, disparity window criteria, criteria for extracting significant points of interest, etc. This data can be provided by the equipment manufacturer, by the user, etc.

FIG. 8B illustates the storage of significant points and type characterization for each waveform, corresponding to Step 240 of FIG. 3.

FIG. 8C illustrates the memory table of allowable matches which is generated for storage in memory as described in Step 270 of FIG. 3.

FIG. 8D illustrates the composite disparity similarity tables stored in memory, as described with regard to Step 290 of FIG. 3. A separate composite table is stored for each significant point of interest to be matched in the first waveform.

FIG. 8E illustrates the best match table created and stored in memory, as described with regard to Step 310 of FIG. 3. This represents the completion of the ambiguity and disparity resolution signal matching methodology, with each entry in the best match table of FIG. 8E corresponding to the maximal value of match for each point for the summed composite similarity values, as graphically illustrated in FIG. 7A for point 1. Each entry in the memory table for best match contains the coordinates of the best match associatively stored corresponding to the identity of the best match point.

The process of the present invention was tested in binocular stereopsis applications using random-dot stereograms and natural images. Random dot stereograms are a suitable vehicle for testing the performance obtained using this process because it is easy to obtain positional information needed for matching in these displays. This enables one to bypass rather involved and time-intensive operations associated with transforming the retinal arrays into suitable units upon which the disparity detection mechanism operates. The process was tested on a broad range of such stereograms. It performs with accuracy close to 100% in stereograms portraying opaque surfaces. The accuracy decreases when transparent surfaces are present (about 70% of points were matched correctly). The process was successfully tested on a noisy stereo image pair obtained by digitizing and thresholding a published random-dot stereogram. This process was also successfully convolved with a "diffeence-of-gaussians" operator to obtain necessary positional information (e.g. zero-crossings) for the matching. Zero-crossings are useful in this context simply as position markers and can be regarded as precursors of edges. Only the zero-crossing positin and polarity were used as features for matching in the test.

The process of the present invention exhibits several important and interesting properties. It is a non-iterative, parallel and local process. The interaction process itself allows for local deformations and is a method based on cooperativity and local consensus.

The disparity similarity function is scaled by the spatial separation of the loci at which the disparities are measured (i.e. it increases with the interfeature distance). Thus, larger spatial separations allow larger disparity differences to participate in the interaction process. For example, the Gaussian interaction function used in the illustrative example offers some measure of immunity to noise introduced by positional inaccuracy and small scale variations due to surface roughness. The interaction process itself is a form of generalized correlation which allows for deformations and belongs to a class of methods based on local consensus. The coherence process is used as a guiding principle in the similarity process and directly subsumes several matching and disambiguation rules commonly used as explicit matching predicates to solve the correspondence problem. Figural continuity and edge connectivity or collinearity are special instances of the coherence principle because spatially continuous surface markings directly imply disparity similarity.

The coherence process allows the transformation from waveform 1 to waveform 2 to be represented as a projection. Therefore, nearby points are projected similarly to a first point, in a like manner, in a similar direction. This determines that certain points can match to other certain points but not to particular other points which may not have a projection in the same direction. Thus, following the coherence process eliminates matching of points which would be physically improbable or impossible. The coherence process is applied within the similarity process to eliminate unlikely matches.

The process of gathering supporting evidence from the neighborhood can be extended by measuring the local image intensity gradient and "deforming" the shape of the support neighborhood (e.g. a horizontally extended rectangle) according to "predominant" gradient orientation in the neighborhood. The idea is that the disparity of features along the direction perpendicular to the gradient, potentially varies less than disparity of features along the local (e.g. luminance) gradient direction. This amounts to biasing the cooperative interactions in favor of local continuity. This is different from postulating a separate orientationally tuned nonlinear grouping process which explicity uses the edge connectivity as a matching constraint.

After tehe step of extracting significant points of interest, the characteristic data for those points can be mapped, associatively, to positional information and stored as triplets, as illustrated in FIG. 8B.

It is important for later application of the coherence principle, and in utilization of the similarity functions, to be able to identify the positional information associated with the characteristic data values for significant points of interest. The minimum data for each point is its positional information and its type, so that types within the set can be appropriately matched. Amplitude or other information beyond type information could be an additional field, but is not required of a minimal configuration.

Data relative to the significant points of interest are stored in the memory of a computer as shown in FIG. 8B. Each significant point of interest can be stored as a data structure (e.g. a triplet of x-coordinate, y-coordinate, and a value such as type, color, amplitude, etc.). For example, point x1, y1 might be a peak, and point x2, y2 might be a valley, with number designators being given to indicate different magnitudes of the peaks and valleys, either as some digitized and measured value, or based on a mapping scheme, where relative magnitudes are mapped to numbers (e.g. where 1 is a small peak, 2 is a medium peak, and 3 is a large peak), using threshold levels rather than absolute measurements. In essence, any criteria can be used with the present invention.

The match (i.e. compatibility) and disparity windows determine the limits between which points of interest in the two waveforms or data sets can be matched or associated for purposes of the similarity process determination. The window is thus defined according to the application, and can be predefined by the system vendor, or user-defined. Thus, while, in general, correlation requires integration from minus infinity to plus infinity, in the present invention, correlation is from the lower limit of the window to the upper limit, providing a finite range over which correlation is made. In mathematical representation, the correlation utilizes the integral of two functions from fixed points A to B.

The compatibility similarity process determines a match similarity value for each matching of a point 1 of waveform 1 to allowable matched types of points of waveform 2 within the match window. For each point within the window, a match value of similarity is determined for each allowable match to corresponding points in the second waveform, repeated for each point within the window of waveform 1. Thus, this match similarity value is an indication of the quality of each match for each point.

In most applications, the composite similarity process is also a function of the relative distance, rather than solely a determination of similarity of types. The relative offsets between allowable match points is proportional to a composite similarity value. Thus, allowable match points which are closer together horizontally along the x axis in matching to a key point of interest are more similar than matched points which are more distant from each other.

The disparity similarity process scales the match similarity value by the spatial separation of the loci at which relative disparity is measured in the disparity domain. The composite similarity process is a composite function of the compatibiity similarity of the types of points being matched and of the disparity similarity of allowable matches within the disparity window. The composite similarity process takes into account x to x, y to y and type to type correlation, and does so according to criteria defined by the user or system designer according to the application. Thus, for example, the separation aspect of the similarity process can simply be a function of the x values of the triplets associated with each point, or of the y values, etc.

As a part of the composite similarity process, a weighting value is determined as a function of the types being matched and the separation. For each point of interest on the first waveform within a disparity window, disparity similarity values are determined for all possible matched points on the second waveform. Next, disparity similarity values are also determined for neighboring points within the window of the first waveform to allowable type matches within the window of the second waveform. For each point, a composite similarity value is determined based on disparity and compatibility similarity values. Similarly offset matched points (i.e. offset of the point on the second waveform relative to the point of interest on the first waveform) have their composite similarity values summed together, in a histogram manner, to determine the most likely match for the first point of interest, as illustrated in FIGS. 7A-C.

The determination of a match is not simply a function of matching a single point on the first waveform to one of a multiplicity of points on a second waveform based upon type values of matches, but is further a function of a composite similarity value for a point based on the neighboring similarity values for similarly offset neighboring matching points. As illustrated in FIG. 6, the composite similarity process takes into acount both type match and separation disparity, and a composite similarity value (e.g. vectored) is determined for each potential match. It is this composite value which is summed to form a histogram (i.e. as shown in FIG. 7A) or a memory image table (i.e. as shown in FIG. 8D) of the composite similarly value for each point of interest.

Thus, there is an averaging over the window to determine the best match for the first point. Next, the second point on the first waveform is made the host point, and the process is repated for its neighboring points within its window, which may or may not change from the window for the first point similarity determination. In this manner a histogram or memory table is constructed, with compositie similarity values for each point based on it and its neighboring points similarities to matched points on a second waveform, used to determine the best match for each point on the first waveform, as illustrated in FIGS. 7A and 8E. Thus, the present invention provides for the application of the coherence process such that neighboring sets of matches are deemed to match in a similarity offset or siiilariy transformed manner. In essence, there is a determination of how well neighboring corresponding matches support the matches for each host point.

There are many criteria for determining the compatiblity similarity process. For example, it can be chosen to be a function of the slope of the edge. Assume that each edge has a slope, and that the difference in slopes between the two edges is an angle, alpha. One similarity function could be determined as proportional to one over the angle alpha. Thus, the smaller the angle differential between the two edges, the more similar the match is considered to be and the higher this first similarity sub-process value would be.

Edges can be detected by any one of a number of techniques, such as digitizing and projecting edges by doing a two-dimensional convolution of the whole waveform such as a Sobel transform, and then comparing the convoluted values line by line. The slope of the edges can also be determined.

A two-dimensional convolution can be performed on the two waveforms which are each analyzed as a two-dimensional array. Another two-dimensional array, relating to positional information, stores a single value for each position in each waveform, the value stored being a one for an edge and zeroes for non-edges. Thus, edge position information for both waveforms is associatively stored. As a next operation, the slope of each edge is determined. This matching and slope determination is done row by row. Once edge positions are known, edge slope measurements are done only where it is relevant to do them, not at all positions. As an example, the Sobel operator is one technique by which edges can be detected. Numerous other techniques are taught in the art. For example, another edge detection technique detects zero crossings in the secondary derivative of the Gaussia smoothing of the images. There is a great deal of literature on detecting edges, and any technique compatible with the desired application domain is acceptable.

The similarity process determines the difference in the slope of the two edges for a match. Thus, for example, the closer two points are in slope, the greater the similarity value. The difference in position or disparity between two matches (i.e. the distance between two points) is related by some constant to the depth at which the point is.

Thus, for example, as in FIG. 1, two cameras could view a robot arm and a distant object, and a system could make determinations based on proper application of the techniques of this invention, including utilization of the similarity process. In this application example, the matching is done on a scanline by scanline basis for the two views represented by the two waveforms. Once having detected the edges, analysis is performed, going left to right, scanline by scanline, to detect the edge positions on each line. Where an edge is found, its slope is measured. As used here, each point on each scanline has some value, such as from 1 to 200, which indicates the magnitude of a wavefrom at a particular point. The scanline from which this analysis is made represents waveforms upon which transformations have been performed. Alternatively, a straight digitized video waveform can be used, with edge detection and slope determination being made on separate passes, with slope being determined by changes in value between neighboring points. In any event, one finds the edges, and then determines the slope of the edges.

Once edges are detected by some edge detection process, positional information for edges are stored for positional mapping of scanline points relative to edge points. The magnitude of particular points on each scanline is associated with the separately stored edge positional information. The magnitude information of a point along with the information regarding positional relevance to edges can be combined to determine the slope of edges.

The disparity similarity process determines similarity based on the similarity of disparities in neighboring allowable matches. For a binocular vision application, the disparity similarity process can be a Gaussian function. Thus, if the offset is large, there is minimal similarity; if the offset is small, there is maximal similarity. The disparity similarity process should in this application decay with increasing similarity.

The combination of the two similarity sub-processes into a composite similarity process can be quite simple. In the illustrated example, there are two variables which have to be taken into account: the similarity of types of points and the offset between two points. The difference in disparity can be analyzed by a two-dimensional Gaussian. The one-dimensional Gaussian can be used for analyzing an original point and matches relative to offsets of neighboring points or matches of similar types. Thus, the similarity process can be applied in one step or two steps.

DETAILED DESCRIPTION OF BINOCULAR STEREOPSIS EXAMPLE

To assist in a deeper understanding of the present invention, a specific example of binocular stereopsis will be discussed hereafter in greater detail for the sake of illustration and clarification. This should not be deemed limiting, as the present invention is independent of the application domain.

This application example illustrates the fusional process of the present invention. Certain issues are orthogonal and are not addressed, such as the issues of multiple spatial scales and their interaction, the type of matching primitives to be used, etc. These considerations are, however, peculiar to the specific application, and are orthogonal to the major problems addressed and solved by the application of the present invention. The result is a fast matching mechanism that does not rely on artificial constraints and can successfully operate in a general environment. Test results demonstrate that useful disparity information can be obtained fast and reliably without a need to postulate any of: inhibitory connections between detectors tuned to different disparities, a coarse-to-fine stratgey (e.g. requiring a sequence of fine vergence eye or camera movements), or an elaborate set of matching and disambiguation rules. Instead of trying to escape the ambiguity problem, the present invention exploits regularities in the distribution of local ambiguities necessarily following from the cohesivity of matter.

Stereopsis is not only a research area in psychology, physiology and psychophysics but also in electronics, signal processing and information processing. Binocular disparity is the difference between the positions of an object on the projection surfaces of the two eyes or visual sensors of any type. These disparities form the basis of binocular depth perception. The information about three-dimensional surfaces can be determined in local point-for-point correlations between elements in the two images because surfaces and shapes appear only after stereopsis has been achieved: each half of the stereo pair exhibits random texture. Such displays represent a form of camouflage.

Random-dot stereograms exemplify the massive ambiguity problem the visual system usually has to face: each picture element in one eye's view can potentially correspond to many elements in the other eye's view. The human visual system can interpret random-dot stereograms portraying transparent surfaces that do not exhibit continuous disparity fields.

This ability posses problems for prior approaches to binocular disparity detection. It challenges the coarse-to-fine strategies in which the spatial resolution is traded off for disparity range to reduce the ambiguity problem. In these schemes, the matches obtained at a coarse resolution over large distances are used to guide matching at a finer resolution over small distances. The fundamental problem with this approach is that sampling the images with large receptive fields averages intensities originating at different depth. In a transparency situation this results in destroying the sought depth information. In fact, it can be demonstrated that these schemes may not work even when viewing opaque surfaces.

To detect the binocular disparity, the visual system has to determine which location in one image corresponds to a given location in the other image. This involves the answer to two questions: what to match (i.e. what are the matching primitives) and how to match (i.e. how to determine the mapping from one image to the other). Correspondence between two images can be established by matching specific features such as blobs or edges, or by matching small regions by direct correlation of image intensities without identifying features.

The basic problem with direct intensity correlation has to do with the fact that things can look significantly different from different points of view. Attempts to match directly the intensity values have had limited success. A stereopair with images that have rather different contrasts can be easily fused. (For example, see B. Julesz, Foundations of Cyclopean Perception, Chicago University Press, Chicago, 1971.) Surface markings and discontinuities are more invariant with respect to the change in viewing direction. Most prior analysis techniques use edges or some other more primitive edge precursors as the main matching primitives. (See for example, D. Marr and T. Poggio, "A Theory of Human Stereopsis," Proc. R. Soc. London, vol. B 204, pp. 301-328, 1979; H. H. Baker, T. O. Binford, and Depth from edge and intensity based stereo, Proc. I. Int. Conf. Art. Intell, pp. 631-636, 1981; J. E. W. Mayhew and J. P. Frisby, "The computation of binocular edges," Perception, vol. 9, pp. 69-87, 1980.).

In this example, assume that the waveform descriptors have a punctiform nature. One advantage of such descriptors (e.g. significant points of interest) is that they can be thought of as carrying only positional information. This property enables one to decouple the question of matching primitives from the problem of using descriptors to detect binocular disparities and allows more direct study of the matching process. The present invention is independent of the matching primitives selected, and does not specify the type of matching primitives to be used.

Choice of significant points of interest and of allowable match types and values is determined responsive to the application domain.

In the stereoscopic application domain, one is dealing with images of the real physical world. Physical objects exhibit one important general property relevant to the matching purpose: they are "cohesive", i.e. the surfaces of objects are smooth relative to the viewing distance. The present invention's system and process take account of the cohesivity of matter. The practical application of the present invention applies this coherence principle to different application domains.

In the stereoscopic application domain, the cohesivity means that the relevant world is not made up of points chaotically varying in depth, but rather of objects, not necessarily opaque, each occupying a well defined 3D volume. This is different from the continuity constraints used explicitly or implicitly in most previous theories. In fact, the cohesivity of matter cannot be used to support the Marr/Poggio type of continuity rule for processing disparities arising from transparent surfaces. (For example, see D. Marr and T. Poggio, "A Cooperative Computation of Stereo Disparity," Science, vol. 194, pp. 283-287, 1976; D. Marr and T. Poggio, "A Theory of Human Stereopsis," Proc. R. Soc. London, Vol. B 204, pp. 301-328, 1979). The continuity rule stipulates that nearby image points are projections of nearby 3D points. This implies smoothness (in the usual sense) of the disparity field. Such continuity holds, however, only for opaque surfaces and non-boundary regions.

The coherence process of the present invention is more general. It recognizes that for transparent surfaces, image proximity does not necessarily imply disparity continuity. While the disparity field may be locally discontinuous, it could be a superposition of locally smooth disparity fields corresponding to individual three-dimensional surfaces if it is generated by an actual three-dimensional scene. These smooth variations usually are apparent only when larger image regions are taken into consideration. Locally, the field may be discontinuous due to disparities originating at different depth. Thus, a discontinuous disparity field may be a superposition of a number of several interlaced continuous disparity fields each corresponding to a piecewise smooth surface. The coherence process captures this possible state of affairs and includes continuous disparity variations associated with opaque surfaces as a special case.

The disparity detection problem can be formulated as a decision problem. In the illustrated vision example, the visual system has to choose, from aset of possible disparities at a position, the disparity which best accounts, in some sense, for the set of possible correspondences in a given neighborhood. The set of possible disparities is limited to possible matches along the epipolar line within an area of fixed radius (e.g. the area of local stereopsis.). (See, for example, K. Prazdny, "Stereoscopic Matching, Eye Position, and Absolute Depth," Perception, Vol. 12, pp. 151-160, 1983.). The coherence process requires that neighboring disparities of elements corresponding to the same 3D object be similar, i.e. neighboring image points corresponding to the same object should have nearly the same disparity. Thus, the principal disambiguation mechanism should be facilitation due to disparity similarity. Dissimilar disparities should not inhibit each other because in a transparency situation, a disparity may be surrounded by a set of different disparities corresponding to other surfaces. Two disparities are either similar, in which case they facilitate each other because they possibly contain information about the same surface, or dissimilar in which case they are informationally orthogonal, and should not interact at all because they potentially carry information about different surfaces.

In order to incorporate the "coherence process" into a practical application, there must be an explicit specification of what is meant by "disparity similarity" (i.e. one has to develop a measure quantifying the similarity between neighboring disparities). As a first approximation, select a simple scalar process capturing the following requirements:

1. The disparity similarity should be inversely proportional to the difference of disparities of interacting points.
2. More distant points should exert less influence, nearby matches should have more disambiguating power.
3. The more distant the two interacting points are the less seriously should their disparity difference be considered because of the inherent uncertainty;
   (a) Steeply-sloped surfaces will generate large disparity differences which should nevertheless contribute to disambiguation;
   (b) For large separations one should probably expect a (nearly) flat support function, i.e. all disparity differences should have the same influence; For small interfeature separations exactly the opposite should be the case: the probability of a large disparity difference is zero in the limit (i.e. the distribution function should peak at the center).

One similarity function capturing all of these requirements is a Gaussian distribution, $$w(i,j) = \frac{1}{c|i-j|\sqrt{2\pi}} \times e^{-\left(\frac{|dj-di|^2}{2C2(|i-j|)^2}\right)} \quad \text{(eq. 1)}$$

where w(i,j) expresses the amount of support disparity di at i receives from disparity dj at j, and i—j is the distance between the two points (c is a scaling constant explained below).

There are several important points to be made about this similarity function.

a. The disparity difference in the exponent of the gaussian weighting function is scaled by the spatial separation of the two inter-acting points. This scaling means that the spread of the gaussian (controlled by $c^2|i-j|$) will be greater for widely separated points. Thus, distant points with a large disparity will be contributing some support whereas nearby points with the same large disparity will give little or no support.

b. Because of the way $c_2|i-j|$ controls the whole shape of the similarity function, when spatial separation is small the size of the weighting from nearby matches is greater.

c. The square root of the non-constant term of the exponent of the gaussian weighting function, $c_2|i-j|$, is related to the "disparity gradient". In fact, this term is the disparity gradient measured on a monocular (as opposed to cyclopean) visual field. Increasing the disparity difference increases the gradient and decreases the magnitude of mutual support between the two disparities. A major difference between this formulation and the notion of "limiting disparity gradient" is that their formulation implies the existence of inhibition between two interacting points while in the present invention two greatly different disparities simply do not interact at all (e.g. see P. J. Burt and B. Julesz, "A Disparity Gradient Limit for Binocular Fusion," Science, vol. 208, pp. 615–617, 1980).

d. Maximal support is obtained when the disparity difference is zero independently of the interfeature separation. This means that a technique based on such a weighting function is slightly biased in favor of fronto-parallel surfaces. This should not, however, be regarded as a weakness. Thus, utilizing the present invention, one can successfully process steeply-sloped surfaces because similar disparities provide greater support than dissimilar ones. The bias towards frontoparallel planes can also be defined on probabilistic grounds. It has been shown that because of foreshortening, surfaces with steep depth gradients occupy only a small portion of most images. Most of the area of the image is covered by surfaces with normals close to the viewing direction. (See, for example, M. H. Kass, "Computing Stereo Correspondence," MS Thesis, MIT, 1984).

In the following example and discussion, it is assumed that the stereograms are obtained by an imaging system in which the separation between the two viewpoints is small relative to the viewing distance. These requirements are met by most visual systems because the interocular separation is small relative to distances for which binocular stereo is useful.

The coherence constraint and the reasoning pertaining to the disparity interactions can be translated into a process which can be implemented by a set of explicit rules. A computer can be used in implementing the process. Basically, the process proceeds in two stages. First, all potential disparities (within an area allowing local stereopsis) are extracted for all points in the left image. Associated with each disparity is a "disparity cell" whose value indicates the amount of similarity support the disparity receives from its neighbors. After the potential disparities at each point are found, neighboring disparities are allowed to interact. The interaction is a simple facilitation based on a measure of similarity (e.g. a Gaussian distribution) between two disparities. For example, suppose that a left image point Li has a set of possible disparities Di and that we are interested in the amount of support a disparity di Di receives from its neighboring point Lj with possible disparities Dj. The process first locates, among disparities in the set Dj, the disparity d* which is the nearest to di, i.e. for which di−dj is the minimum. The activity of the "disparity cell" associated with possible disparity di of the point Li is then incremented by an appropriate amount w(i,j) (i.e. which is the support a given disparity at i receives from disparities at (j) obtained by substituting into equation 1, using di−d* as the disparity difference. After all possible disparities at a given point have been updated in this way the disparity with the largest amount of support is chosen as the most likely disparity at that point.

This procedure as described above can be applied to the left and right image in parallel. All points for which the left and right disparities differ are marked as ambiguous. The decision about the disparity at such places is postponed and left for other processes to decide.

As a more detailed example, suppose that a left image point Li has a set of possible disparities Di and a neighboring point Lj, Dj. Then, for each disparity dk (i)∈Di we locate, among disparities in the set Dj, the disparity d1*(j)∈Dj which is the closest to it. The activity of the "disparity cell" associated with possible disparity dk(i) of the point Li is then incremented by an amount which is inversely proportional to the disparity difference between these two disparities. More specifically, the cell's activity is incremented by $$\frac{1}{\sigma(i,j)\sqrt{2\pi}} e^{-\left(\frac{|d1^*(j)-dk(i)|^2}{2\sigma^2}\right)}$$

where $\sigma(i,j)=C-|i-j|$ (c=constant), i.e., $\sigma$ is a simple function of the distance between Li and Lj.

In other words, more distant disparities (both in space and disparity) contribute less evidence for a given disparity. After all points in the neighborhood of a given point have been consulted in this way the disparity with the largest amount of support is chosen as the most likely disparity at that point. The uniqueness constraint (a given point on a physical surface has only one location so that only one binocular match is correct) is thus enforced not by mutual inhibition of neurones along a given line of sight but by a strategy in which the most active cell indicates the most likely disparity at a given moment. The process as described above can be implemented for the left and right image in parallel and all points at which the left and right disparities differ are marked as ambiguous, as described above. The performance results obtained using this process is affected by the selection of the value of c in Equation 1. This is the only "free variable" in the process. If c is set to be small, the system will perform well for fronto-parallel surfaces but will perform rather poorly for other surface orientations. The present invention has found, empirically, that a value between 0.55 and 0.85 gives a good all around performance for a wide range of surface orientations.

While there have been described above various embodiments of the present invention for the purpose of illustrating the manner in which the invention may be used to advantge, it will be appreciated that the invention is not limited to the disclosed embodiments.

Accordingly, any modification, variation, or equivalent arrangement within the scope of the accompanying claims should be considered to be within the scope of the invention.

What is claimed is:

1. A process for matching two related but transformed signal waveforms representative of sensor outputs in a particular application domain, said process comprising the steps of:

selecting criteria, associated with the particular application domain, for use in the determination of significant points of interest, type sets of allowable types of point matches, type match valuation, match windows, disparity windows, and disparity similarity valuation;

identifying significant points of interest in each data set;

determining positional offset information and type information for significant points of interest in each data set responsive to said criteria;

determining a match window for each significant point of interest responsive to said criteria;

locating and determining match values for all allowable matches between significant points in the two data sets, within respective match windows;

determining disparity windows for all significant points in the two data sets;

determining composite similarity values for each allowable match to a particular significant point in the first data set, responsive to the positional offset information for each allowable match to said particular point and to the positional offset information for correspondingly offset allowable matches for other significant points in the first data set, for such points within the disparity window with said particular point, responsive to the match values;

determining a best match for each said particular point within the first data set corresponding to the allowable match point in the second data set having the maximum composite similarity value for the respective particular point, responsive to the match values and the composite similarity values; and matching the two signal waveforms responsive to the criteria and the determined best matches.

2. The process as in claim 1 further comprising the steps of:

storing said determined type information associatively mapped to positional information for each significant point of interest in each data set;

storing, for each significant point of interest in the first data set, said match values each associatively mapped to positional offset data representative of the respective relative distance offset between each significant point in the first data set and each respective allowable match point in the second data set;

storing said composite similarity values, associatively mapped to positional offset data, for each allowable match to a particular point in the first data set; and storing said best match values associatively mapped to the positional offset information for the particular point, and for the allowable match point in the second data set having the maximum composite similarity value for the respective particular point, responsive to the match value and the composite similarity value.

3. The process as in claim 1 further comprising the step of:

analyzing relationships in parallel of multiple points of the two data sets within the window, to determine a best value match for each point of interest on the first waveform.

4. The process as in claim 1 further comprising the step of:

relating positional offset data for corresponding best match points between the first and second waveforms to yield a fused data set representing coherent data about the related waveforms.

5. The process as in claim 1 wherein the step of determining composite similarity values is further characterized as being based on cooperatively and local consensus.

6. The process as in claim 1 wherein the step of determining composite similarity values is further comprised of the step of:

allowing for local deformations in the interaction of the data sets.

7. The process as in claim 1 wherein the step of determining the composite similarity value is further comprised of the step of:

scaling the valuation of neighboring allowable matches by the spatial separation of the points at which the disparities are measured.

8. The process of claim 1 wherein the step of determining the composite similarity value is further comprised of the steps of:

determining a predominant gradient orientation for each waveform, and modifying the disparity window responsive to the predominant gradient.

9. The process as in claim 1 further comprising the step of:

biasing the determination of composite similarity in favor of local continuity.

10. A system for matching two related but transformed signal waveforms representative of sensor outputs, said system comprising:

means for providing criteria for use in the determination of significant points of interest, type sets of allowable types of point matches, type match valuation, matching widows, disparity windows, and disparity similarity valuation;

means for determining significant points of interest in each data set;

means for determining positional offset information and type information for significant points of interest in each data set responsive to said criteria;

means for determining a match window for each significant point of interest responsive to said criteria;

means for locating and determining match values for all allowable matches between points in the two data sets, within said respective match windows, responsive to the criteria;

means for determining disparity windows for all significant points in the two data sets, responsive to the criteria;

means for determining, and storing, composite similarity values, associatively mapped to positional offset data, for each allowable match to a particular point in the first data set, responsive to the positional offset information for each allowable match to said point and to the positional offset information for corespondingly offset allowable matches for other significant points in the first data set, for significant points within the disparity window for said particular point, responsive to the criteria and to the match values for each respective allowable match;

means for storing as a best match, for each said particular point within the first data set, positional information for the particular point and for the respective allowable match point in the second data set having the maximum composite similarity value for the respective particular point, responsive to the criteria, the respective match value, and the composite similarity value store; and means for matching the two signal waveforms and resolving ambiguities therebetween responsive to said criteria and the best match store.

11. The system as in claim 10 further comprising:
means for determining in parallel the best match for multiple significant points of interest on the first waveform.

12. The system as in claim 10 further comprising:
means for relating positional offset data for corresponding best match points between the first and second waveform to yield a fused data set representing coherent data about the two related waveforms.

13. The system as in claim 10 further characterized as determining composite similarity based on cooperativity and local consensus.

14. The system as in claim 10 wherein said means for determining composite similarity values is further characterized as allowing for local deformations in the interaction of the data sets.

15. The system as in claim 10 further characterized in that said composite similarity value contribution for each allowable match is scaled by the spatial separation of the significant points of interest at which the disparities are measured.

16. The system as in claim 10 wherein said means for determining said composite similarity value is further comprised of:
means for determining a predominant gradient orientation, means for measuring the local image intensity gradient, and means for modifying the disparity window responsive to said predominant gradient, said local gradient, and to the criteria.

17. The system as in claim 10 further comprising:
means for biasing the determination of composite similarity in favor of local continuity.

18. A stereo correspondence process for matching of figurally similar three dimensional images responsive to discretized representations of the images, comprising the step of
determining significant features and positions there for each of the images;
determining all potential matches of features as between the two images in accordance with predefined feature matching windows;
determining support for each potential match of features responsive to a predefined disparity valuation function for valving support of potential matches of neighboring features within a predefined window;
utilizing all support disparity values for each potential feature match to determine a composite value for each potential feature match;
selecting as a best match the maximum composite value for each individual feature of one image to features of the other image;
matching the images for stereo correspondence according to the selected best matches.

19. The process as in claim 18 further comprising:
storing identifying characteristic data representative of determined significant features for each image in a memory, said identifying characteristic data associatively mapped to its respective position in the respective image;
storing value characteristic data representative of determined potential matches in a memory, said value characteristic data associately mapped to positional data for the respective features in the images; and
summing in respective separate memories, the respective support disparity values for each respective feature in one image, associatively mapped according to relative offset of potential matches.

20. A process for matching two transformed but related signals, comprising the steps of:
provding selection criteria for significant points of interest, type sets for allowable matches, matching window, disparity window, disparity similarity valuation and type match valuation;
storing separately digitized data sets for the two signals, each data set associately mapped by relative positional information within each signal;
analyzing each data set according to the selection criteria to determine location and type value for each significant point of interest, and storing the type value associatively mapped to the position of each point;
determining match windows responsive to the selection criteria;
locating allowable matches between significant points of interest in the two data sets within each mach window responsive to the selection criteria and to the associatively mapped type store;
valuing each allowable match responsive to the selection criteria, and
storing the match values, associatively mapped according to positional offset and according to each particular points' position within the first data set;
determining disparity windows responsive to the selection criteria for all points within the data sets;
determining composite similarity values for each allowable match for each particular point in the first data set based on disparity similarity of allowable matches for the particular point and of neighboring points in the first data set within the disparity window;
accumulating sums in separate "activity cells" for the disparity similarity values for allowable matches to the particular point and neighboring points according to positional offsets, responsive to the associatively mapped match value store to the selection criteria;
selecting the maximally valued activity cell for each particular point as identifying the best match for the particular point;
storing positional data for the best match from the second data set for each point of interest in the first data, associatively mapping the corresponding best match points to each other;
matching the two signals and removing disparities therebetween responsive to the selection criteria and to the best match mapped store.

* * * * *